United States Patent Office 3,671,100
Patented June 20, 1972

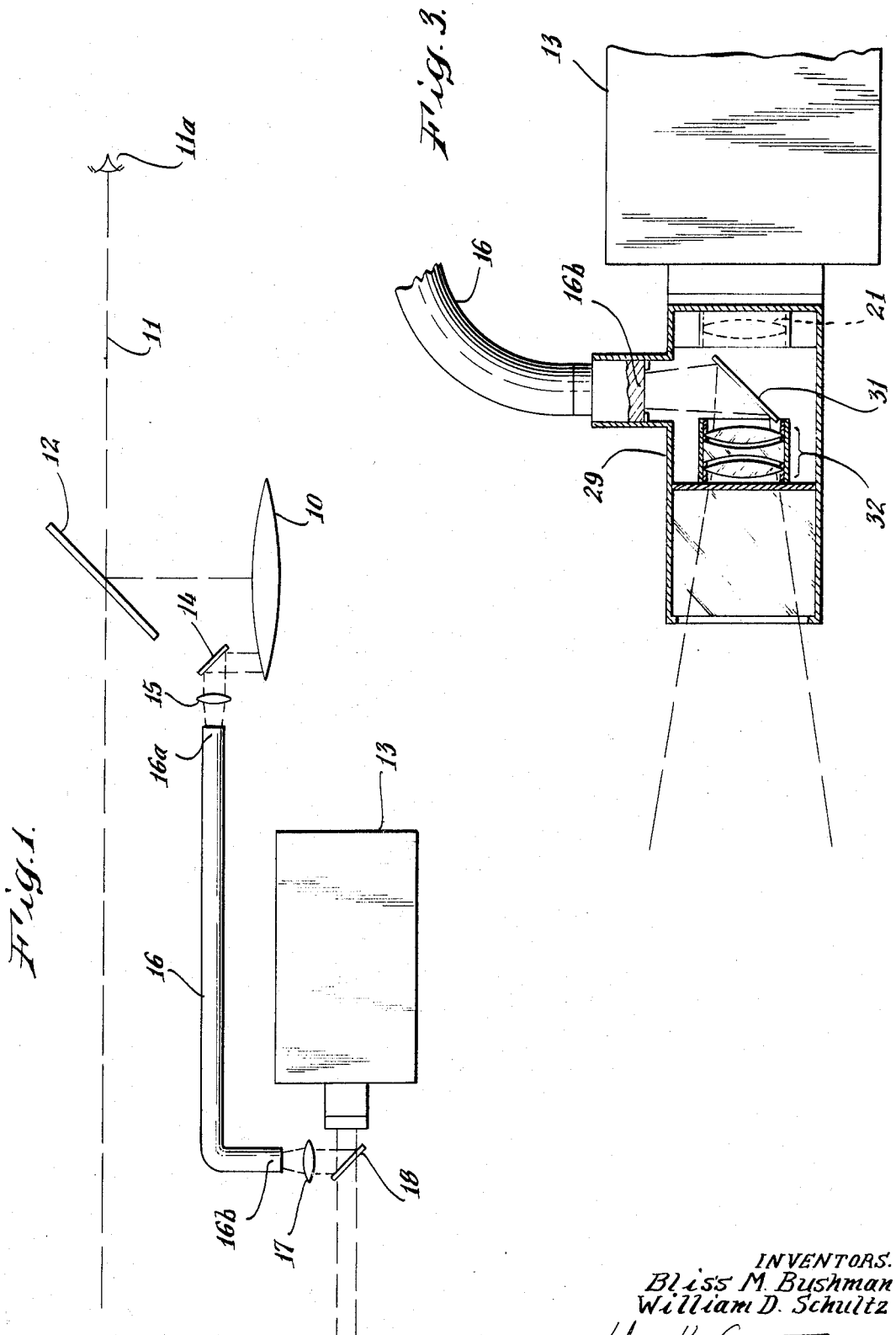

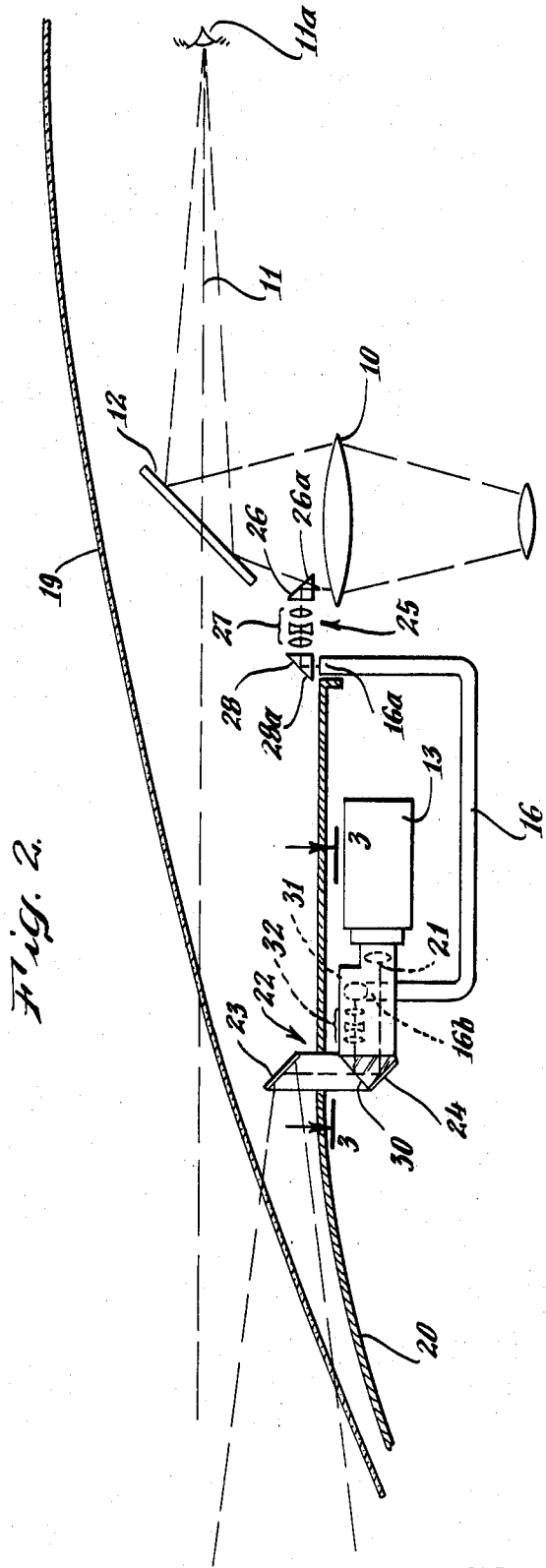

3,671,100
SYSTEM FOR INTEGRATING GUNSIGHT RETICLE IMAGE AND IMAGE RECEIVED BY A CAMERA
Bliss M. Bushman, Claremont, and William D. Schultz, Bradbury, Calif., assignors to The Perkins-Elmer Corporation, Norwalk, Conn.
Filed Oct. 23, 1970, Ser. No. 83,485
Int. Cl. G02b 21/00, 23/00
U.S. Cl. 350—19
7 Claims

ABSTRACT OF THE DISCLOSURE

For integrating an aircraft gunsight or HUD (head up display) reticle image and an image received by a camera mounted in the aircraft with its lens aimed to photograph a view corresponding to the view through the reticle, an image of the reticle from an edge portion of a collimating lens which is associated with the gunsight reticle is focussed onto one end of the bundle of optical fibers. At the other end of the bundle the reticle image is collimated and superimposed on the image received by the camera.

---

The present invention relates to gun cameras which are carried on military fighter aircraft to photograph targets at which the guns or rockets on the aircraft are aimed by the pilot. In particular the invention is a system for superimposing the gunsight reticle or HUD (head up display) image as seen by the pilot on the image received by the camera so that the camera records the pilot's view of a target as observed through the reticle or on the HUD.

In the type of fighter aircraft with which the system of the present invention is particularly adapted to be used the various armaments, such as guns, bombs, guided missiles or rockets are mounted in fixed position relative to the axis of the aircraft and the pilot aims them to hit a selected target by aiming the aircraft. For aiming the aircraft a fire control and director system moves a gunsight reticle (cross hairs and/or concentric rings) a certain distance in a direction with respect to the axis of the aircraft to compensate lead angle and G load factors such that when the pilot has a target visually aligned with the center of the reticle the aircraft will be appropriately sighted for the particular weapon concerned to hit the target. In this system the reticle is customarily a reflex type in which an image of the reticle is projected at infinity indirectly into the eyes of the pilot; the reticle image is projected by a gunsight objective lens onto a combining glass that is placed in the pilot's line of sight so that the pilot may see in the same plane, at optical infinity, a target in front of the aircraft and the image of the reticle superimposed on the target.

The gun camera is aligned to photograph what the weapons are aimed at, but it is desired to have the photographs also show the reticle in order to record the pilot's view of the target with reference to the reticle. One system for accomplishing this is a periscope arrangement which conducts the actual scene viewed by the pilot through the combining glass to the camera by means of a periscope mounted with its input end peering over the pilot's shoulder next to his head as illustrated by U.S. Pat. No. 3,057,258. This, however, blocks the pilot's view on one side and is a distraction. It also involves a rather cumbersome train of optical elements which takes up a disproportionate amount of the already limited space in the cockpit of the aircraft.

It has also been proposed to transfer the scene as viewed by the pilot with the reticle image superimposed thereon to the camera using fiber optics. As with the aforementioned periscope system, however, this system involves placing the input end of the fiber optics transfer system close to the pilot's head to see what the pilot actually sees and thus has the same space and distraction disadvantages of the periscope sytem. Moreover, in such a system in order to provide the high resolution required to produce a suitable picture of the target and the reticle the fiber optics would have to consist of a fiber bundle containing quite a large number of fine, small diameter optical fibers which could be rather expensive and cumbersome to arrange in the cockpit.

The above disadvantages are avoided in the system of the present invention in accordance with which the camera is mounted in alignment with the weapons to photograph the field of view in front of the aircraft and the image of the reticle is picked up by a reflecting surface from the objective lens of the gunsight or the HUD, from which objective lens the reticle image emerges in parallel light. The parallel light bundle is reflected to an objective lens which in turn focusses the image on one end of an optical fiber bundle. At the other end of the optical fiber bundle the reticle image is recollimated and projected onto a combining glass which is in the optical path of the camera so that the reticle image is superimposed on the field of view of the camera. The reticle image is thus superimposed on a target image photographed by the camera.

Since in the system of this invention it is only necessary that the reticle image be transferred by fiber optics and need only be transferred with sufficient resolution to provide a recognizable image of the reticle, the bundle of fiber optics may be made smaller, including relatively fewer individual optical fibers, and of larger diameter, than would be required for transferring a total image including the target image and the reticle image.

With the system of this invention neither the camera nor the optical fiber bundle need be in the cockpit and there is no necessity for any part of the system to be near or in line with the pilot's head where it would obscure the pilot's view in some direction and be a distraction. Aside from having the input end of the fiber optic bundle in position to pick up the reticle image from the gunsight objective lens and having the camera exposed in the same direction as the guns or rockets, the camera and fiber optic bundle may be arranged with unlimited flexibility in the nose portion of the aircraft.

A system in accordance with the present invention has been utilized to photograph aerial and/or ground targets on film when a minimum resolution of 50 lines per millimeter and targets more than a mile from the aircraft have been readily identifiable in photographs taken of them.

Further objects, advantages and features of the system of the present invention will be apparent from the following detailed description of the invention as illustrated by the accompanying drawings in which:

FIG. 1 is a schematic illustration of a system in accordance with the present invention;

FIG. 2 is a side view of an illustrative embodiment of this system; and

FIG. 3 is an enlarged section along the line 3 of FIG. 2.

Referring to the schematic drawing of FIG. 1, the system for integrating the image of a gunsight reticle and an image received by a gun camera of this invention is used in combination with a gunsight objective lens 10, which projects an image of a gunsight reticle from a conventional aircraft gunsight, or HUD, mechanism (not shown) into the line of sight 11 of the aircraft's pilot by means of a combining glass 12, and a gun camera 13 mounted in the aircraft in alignment with the aircraft or sight axis to photograph a view corresponding to the view in front of the aircraft, which is a view corresponding to the view the pilot sees through the gunsight reticle. In accordance with the invention the system includes a reflecting surface 14 positioned at one edge portion of the gunsight objective lens 10 for reflecting the reticle image emerging as parallel light from the latter lens into a lens or lens system 15 which focusses the reticle image onto the end 16a of a bundle of optical fibers 16.

At the other end 16b of the fiber optic bundle 16 the reticle image emerging therefrom is collimated to infinity by a lens 17 which projects the image onto a combining glass 18 in the optical path of the camera 13 for superimposing the reticle image on the target image received by the camera through its own objective lens.

FIGS. 2 and 3 illustrate a particular embodiment of the system of this invention as mounted in a military fighter aircraft such as U.S.A. F4 series aircraft. The pilot's line of sight 11 is indicated by a line from the eye 11a of the pilot in the cockpit forward through the combining glass 12, onto which the gunsight reticle image is projected by the gunsight objective lens 10, and through the windshield 19 of the aircraft. Below the windshield 19 and the pilot's line of sight 11 is a generally horizontal glare shield indicated at 20. The gun camera 13 and the bundle of optical fibers 16 are shown mounted below the glare shield 20. In this instance the apparent position of the camera lens 21 is extended above the glare shield 20 by means of a periscope 22 suitably consisting of solid glass transfer optics and having an angular reflecting surface 23 at its upper input end and a parallel, angular reflecting surface 24 at its lower end. The field of view of the camera 13 is thus defined by the light entering the upper end of the periscope 22 and reflected downward from the reflecting surface 23 to the reflecting surface 24 from which the light passes into the camera 13 through the camera lens 21. The field of view of the camera 13 defined by the lens 21 and the diameter of the optical path through the periscope 22 is suitably 8 degrees vertically and 11 degrees horizontally.

In the embodiment shown in FIGS. 2 and 3 the reticle image emerging from the upper side of the gunsight objective lens 10 as parallel light is bent and focussed onto input end 16a of the optical fiber bundle 16 by a prism lens assembly 25 consisting of a prism 26 having a reflecting surface 26a aligned to reflect the reticle image through a Cooke lens triplet 27 consisting of a negative lens equally spaced between a pair of positive lenses which focusses the image on the input end 16a of the fiber optic bundle via a prism 28 having a reflecting surface 28a.

As most clearly shown in FIG. 3 the other, output end 16b of the fiber optic bundle 16 is connected to open through the side of a housing 29 in which the camera lens 21 and periscope 22 are mounted and which defines the optical path to the camera 13. The lower portion of the periscope 22 has incorporated therein a combining glass layer 30 across the optical path through the periscope and at a 90 degree angle to the periscope lower reflecting surface 24. Inside the housing 29 the reticle image emerging from the end 16b of the fiber optic bundle impinges upon a reflector 31 which reflects the image through a Cooke lens triplet 32 which collimates the image to infinity and projects it onto the combining glass layer 30 which thus superimposes the reticle image onto the image received by the camera 13 through the periscope 22.

As noted above since the image of a target is received by the camera directly or through a simple periscope so that only the reticle image is transferred by an optical fiber bundle, the resolution of the optical fiber bundle and the size of the individual fibers need only be sufficient to transfer a recognizable image of the reticle. Consequently, the bundle of optical fibers may be quite small and consist of larger diameter fibers than would be required for transferring a finer resolution image so that a relatively inexpensive and rugged fiber optic system is suitable for the system of this invention. An additional advantage of this system is that all the components are simple, rugged and are easily adapted to be rigidly mounted so that the elements of the system are not subject to being loosened and displaced by vibration so that consistently clear, sharp photographs in which the gunsight reticle is superimposed on the target image are produced.

What is claimed is:

1. In combination with an aircraft gunsight and a camera, a reticle and a lens for projecting an image of the reticle into the gunsight and the camera, the camera being mounted to photograph a view corresponding to the view through the gunsight, means for superimposing said reticle image on the image viewed through said gunsight, means for superimposing said reticle image on the image received by the camera comprising, a bundle of optical fibers, means focusing a projection of the reticle image onto one end of the optical fiber bundle, and means collimating light emerging from the other end of the bundle and projecting the reticle image carried thereby into the optical path to the camera.

2. The combination of claim 1 in which said lens projecting an image of the reticle is a collimating lens and which includes first reflecting means receiving an image of the reticle from a portion of the collimating lens and redirecting the latter image through first lens means that focusses said image onto one end of the optical fiber bundle.

3. The combination of claim 2 including second lens means at the other end of the optical fiber bundle receiving and collimating light from said other end and projecting the reticle image carried thereby and means including a beam splitter in the optical path of the camera receiving the reticle image projected from the second lens means and superimposing the reticle image on an image received by the camera.

4. The combination of claim 3 in which the first lens means and the second lens means each include substantially the same form of lens component arranged respectively for focussing collimated light onto one end of the optical fiber bundle and for collimating focussed light emerging from the other end of the bundle.

5. The combination of claim 4 in which said lens components are Cooke triplets.

6. The combination of claim 1 which includes first reflecting means receiving an image of the reticle from said lens that projects an image of the reticle and redirects the received image through first lens means that focusses said image onto one end of the optical fiber bundle, second lens means at the other end of the optical fiber bundle receiving and collimating light from said other end and projecting the reticle image carried thereby, and combining glass means in the optical path of the camera receiving the reticle image projected from the second lens means thereby to superimpose the reticle image on an image received by the camera.

7. The combination of claim 1 in which said camera has its optical path through a periscope consisting of solid glass, and any relay lenses included for extending the length of the periscope, having at least a pair of reflecting surfaces angularly arranged for light entering one area of the glass to be folded and directed through the glass and into the camera, said glass incorporating a beam splitter in the optical path therethrough receiving light emerging from said other end of the optical fiber bundle, and lens means between said other end of the bundle and the beam splitter for projecting an image of the reticle carried through the optical fiber bundle onto the beam splitter and thereby superimpose the reticle image on an image received by the camera.

References Cited

UNITED STATES PATENTS

| | | | |
|---|---|---|---|
| 3,439,982 | 4/1969 | Ludwig | 350—174 UX |
| 3,446,916 | 5/1969 | Abel et al. | 356—251 UX |

OTHER REFERENCES

Diegert, M. B.: "Earth Sighting Simulator," IBM Technical Disclosure Bulletin, vol. No. 8, No. 1, June 1965, pp. 128–130.

DAVID SCHONBERG, Primary Examiner

T. H. KUSMER, Assistant Examiner

U.S. Cl. X.R.

35—12 N; 95—4.5; 350—96, 174; 356—251, 252